United States Patent
Braho et al.

(10) Patent No.: US 10,269,342 B2
(45) Date of Patent: Apr. 23, 2019

(54) METHOD AND SYSTEM FOR RECOGNIZING SPEECH USING WILDCARDS IN AN EXPECTED RESPONSE

(71) Applicant: Hand Held Products, Inc., Fort Mill, SC (US)

(72) Inventors: Keith Braho, Murrysville, PA (US); Jason M Makay, Monroeville, PA (US)

(73) Assignee: HAND HELD PRODUCTS, INC., Fort Mill, SC (US)

( * ) Notice: Subject to any disclaimer, the term of this patent is extended or adjusted under 35 U.S.C. 154(b) by 328 days.

(21) Appl. No.: 14/527,191

(22) Filed: Oct. 29, 2014

(65) Prior Publication Data
US 2016/0125873 A1    May 5, 2016

(51) Int. Cl.
| | |
|---|---|
| *G10L 15/07* | (2013.01) |
| *G10L 25/51* | (2013.01) |
| *G10L 15/065* | (2013.01) |
| *G10L 15/22* | (2006.01) |
| *G10L 15/08* | (2006.01) |

(52) U.S. Cl.
CPC ............ *G10L 15/07* (2013.01); *G10L 15/065* (2013.01); *G10L 15/22* (2013.01); *G10L 25/51* (2013.01); *G10L 2015/088* (2013.01)

(58) Field of Classification Search
CPC ........ G10L 15/01; G10L 15/06; G10L 15/065
USPC ......................................... 704/239, 240, 270
See application file for complete search history.

(56) References Cited

U.S. PATENT DOCUMENTS

| | | |
|---|---|---|
| 4,882,757 A | 11/1989 | Fisher et al. |
| 6,832,725 B2 | 12/2004 | Gardiner et al. |
| 7,128,266 B2 | 10/2006 | Marlton et al. |
| 7,159,783 B2 | 1/2007 | Walczyk et al. |
| 7,413,127 B2 | 8/2008 | Ehrhart et al. |

(Continued)

FOREIGN PATENT DOCUMENTS

| | | |
|---|---|---|
| EP | 1011094 A1 | 6/2000 |
| WO | 2007118029 A2 | 10/2007 |

(Continued)

OTHER PUBLICATIONS

U.S. Appl. No. 13/367,978, filed Feb. 7, 2012, (Feng et al.); now abandoned.

(Continued)

*Primary Examiner* — Jakieda R Jackson
(74) *Attorney, Agent, or Firm* — Additon, Higgins & Pendleton, P.A.

(57) ABSTRACT

A speech recognition system used in a workflow receives and analyzes speech input to recognize and accept a user's response to a task. Under certain conditions, a user's response might be expected. In these situations, the expected response may modify the behavior of the speech recognition system to improve recognition accuracy. For example, if the hypothesis of a user's response matches the expected response then there is a high probability that the user's response was recognized correctly. An expected response may include expected words and wildcard words. Wildcard words represent any recognized word in a user's response. By including wildcard words in the expected response, the speech recognition system may make modifications based on a wide range of user responses.

20 Claims, 5 Drawing Sheets

(56) References Cited

U.S. PATENT DOCUMENTS

| | | |
|---|---|---|
| 7,726,575 B2 | 6/2010 | Wang et al. |
| 7,827,032 B2 | 11/2010 | Braho et al. |
| 7,865,362 B2 | 1/2011 | Braho et al. |
| 7,895,039 B2 | 2/2011 | Braho et al. |
| 7,949,533 B2 | 5/2011 | Braho et al. |
| 8,200,495 B2 | 6/2012 | Braho et al. |
| 8,255,219 B2 | 8/2012 | Braho et al. |
| 8,294,969 B2 | 10/2012 | Plesko |
| 8,317,105 B2 | 11/2012 | Kotlarsky et al. |
| 8,322,622 B2 | 12/2012 | Suzhou et al. |
| 8,366,005 B2 | 2/2013 | Kotlarsky et al. |
| 8,371,507 B2 | 2/2013 | Haggerty et al. |
| 8,374,870 B2 | 2/2013 | Braho et al. |
| 8,376,233 B2 | 2/2013 | Van Horn et al. |
| 8,381,979 B2 | 2/2013 | Franz |
| 8,390,909 B2 | 3/2013 | Plesko |
| 8,408,464 B2 | 4/2013 | Zhu et al. |
| 8,408,468 B2 | 4/2013 | Horn et al. |
| 8,408,469 B2 | 4/2013 | Good |
| 8,424,768 B2 | 4/2013 | Rueblinger et al. |
| 8,448,863 B2 | 5/2013 | Xian et al. |
| 8,457,013 B2 | 6/2013 | Essinger et al. |
| 8,459,557 B2 | 6/2013 | Havens et al. |
| 8,469,272 B2 | 6/2013 | Kearney |
| 8,474,712 B2 | 7/2013 | Kearney et al. |
| 8,479,992 B2 | 7/2013 | Kotlarsky et al. |
| 8,490,877 B2 | 7/2013 | Kearney |
| 8,517,271 B2 | 8/2013 | Kotlarsky et al. |
| 8,523,076 B2 | 9/2013 | Good |
| 8,528,818 B2 | 9/2013 | Ehrhart et al. |
| 8,544,737 B2 | 10/2013 | Gomez et al. |
| 8,548,420 B2 | 10/2013 | Grunow et al. |
| 8,550,335 B2 | 10/2013 | Samek et al. |
| 8,550,354 B2 | 10/2013 | Gannon et al. |
| 8,550,357 B2 | 10/2013 | Kearney |
| 8,556,174 B2 | 10/2013 | Kosecki et al. |
| 8,556,176 B2 | 10/2013 | Van Horn et al. |
| 8,556,177 B2 | 10/2013 | Hussey et al. |
| 8,559,767 B2 | 10/2013 | Barber et al. |
| 8,561,895 B2 | 10/2013 | Gomez et al. |
| 8,561,903 B2 | 10/2013 | Sauerwein |
| 8,561,905 B2 | 10/2013 | Edmonds et al. |
| 8,565,107 B2 | 10/2013 | Pease et al. |
| 8,571,307 B2 | 10/2013 | Li et al. |
| 8,579,200 B2 | 11/2013 | Samek et al. |
| 8,583,924 B2 | 11/2013 | Caballero et al. |
| 8,584,945 B2 | 11/2013 | Wang et al. |
| 8,587,595 B2 | 11/2013 | Wang |
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,612,235 B2 | 12/2013 | Braho et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 8,740,082 B2 | 6/2014 | Wilz |
| 8,740,085 B2 | 6/2014 | Furlong et al. |
| 8,746,563 B2 | 6/2014 | Hennick et al. |
| 8,750,445 B2 | 6/2014 | Peake et al. |
| 8,752,766 B2 | 6/2014 | Xian et al. |
| 8,756,059 B2 | 6/2014 | Braho et al. |
| 8,757,495 B2 | 6/2014 | Qu et al. |
| 8,760,563 B2 | 6/2014 | Koziol et al. |
| 8,736,909 B2 | 7/2014 | Reed et al. |
| 8,777,108 B2 | 7/2014 | Coyle |
| 8,777,109 B2 | 7/2014 | Oberpriller et al. |
| 8,779,898 B2 | 7/2014 | Havens et al. |
| 8,781,520 B2 | 7/2014 | Payne et al. |
| 8,783,573 B2 | 7/2014 | Havens et al. |
| 8,789,757 B2 | 7/2014 | Barten |
| 8,789,758 B2 | 7/2014 | Hawley et al. |
| 8,789,759 B2 | 7/2014 | Xian et al. |
| 8,794,520 B2 | 8/2014 | Wang et al. |
| 8,794,522 B2 | 8/2014 | Ehrhart |
| 8,794,525 B2 | 8/2014 | Amundsen et al. |
| 8,794,526 B2 | 8/2014 | Wang et al. |
| 8,798,367 B2 | 8/2014 | Ellis |
| 8,807,431 B2 | 8/2014 | Wang et al. |
| 8,807,432 B2 | 8/2014 | Van Horn et al. |
| 8,820,630 B2 | 9/2014 | Qu et al. |
| 8,822,848 B2 | 9/2014 | Meagher |
| 8,824,692 B2 | 9/2014 | Sheerin et al. |
| 8,824,696 B2 | 9/2014 | Braho |
| 8,842,849 B2 | 9/2014 | Wahl et al. |
| 8,844,822 B2 | 9/2014 | Kotlarsky et al. |
| 8,844,823 B2 | 9/2014 | Fritz et al. |
| 8,849,019 B2 | 9/2014 | Li et al. |
| D716,285 S | 10/2014 | Chaney et al. |
| 8,851,383 B2 | 10/2014 | Yeakley et al. |
| 8,854,633 B2 | 10/2014 | Laffargue |
| 8,866,963 B2 | 10/2014 | Grunow et al. |
| 8,868,421 B2 | 10/2014 | Braho et al. |
| 8,868,519 B2 | 10/2014 | Maloy et al. |
| 8,868,802 B2 | 10/2014 | Baden |
| 8,868,803 B2 | 10/2014 | Bremer et al. |
| 8,870,074 B1 | 10/2014 | Gannon |
| 8,879,639 B2 | 11/2014 | Sauerwein |
| 8,880,426 B2 | 11/2014 | Smith |
| 8,881,983 B2 | 11/2014 | Havens et al. |
| 8,881,987 B2 | 11/2014 | Wang |
| 8,903,172 B2 | 12/2014 | Smith |
| 8,908,995 B2 | 12/2014 | Benos et al. |
| 8,910,870 B2 | 12/2014 | Li et al. |
| 8,910,875 B2 | 12/2014 | Ren et al. |
| 8,914,290 B2 | 12/2014 | Hendrickson et al. |
| 8,914,788 B2 | 12/2014 | Pettinelli et al. |
| 8,915,439 B2 | 12/2014 | Feng et al. |
| 8,915,444 B2 | 12/2014 | Havens et al. |
| 8,916,789 B2 | 12/2014 | Woodburn |
| 8,918,250 B2 | 12/2014 | Hollifield |

(56) References Cited

U.S. PATENT DOCUMENTS

| | | |
|---|---|---|
| 8,918,564 B2 | 12/2014 | Caballero |
| 8,925,818 B2 | 1/2015 | Kosecki et al. |
| 8,939,374 B2 | 1/2015 | Jovanovski et al. |
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | Akel et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| D733,112 S | 6/2015 | Chaney et al. |
| 9,047,098 B2 | 6/2015 | Baden |
| 9,047,359 B2 | 6/2015 | Caballero et al. |
| 9,047,420 B2 | 6/2015 | Caballero |
| 9,047,525 B2 | 6/2015 | Barber |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,082,023 B2 | 7/2015 | Feng et al. |
| 2005/0071158 A1 | 3/2005 | Byford |
| 2006/0178882 A1 | 8/2006 | Braho et al. |
| 2007/0063048 A1 | 3/2007 | Havens et al. |
| 2007/0192095 A1* | 8/2007 | Braho ............... G10L 15/01 704/232 |
| 2007/0198269 A1* | 8/2007 | Braho ............... G10L 15/06 704/270 |
| 2009/0067756 A1* | 3/2009 | Meyer ............... G06K 9/03 382/310 |
| 2009/0134221 A1 | 5/2009 | Zhu et al. |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2011/0029312 A1 | 2/2011 | Braho et al. |
| 2011/0029313 A1 | 2/2011 | Braho et al. |
| 2011/0161079 A1 | 6/2011 | Gruhn et al. |
| 2011/0169999 A1 | 7/2011 | Grunow et al. |
| 2011/0202554 A1 | 8/2011 | Powilleit et al. |
| 2012/0111946 A1 | 5/2012 | Golant |
| 2012/0168512 A1 | 7/2012 | Kotlarsky et al. |
| 2012/0193423 A1 | 8/2012 | Samek |
| 2012/0203647 A1 | 8/2012 | Smith |
| 2012/0223141 A1 | 9/2012 | Good et al. |
| 2013/0043312 A1 | 2/2013 | Van Horn |
| 2013/0075168 A1 | 3/2013 | Amundsen et al. |
| 2013/0175341 A1 | 7/2013 | Kearney et al. |
| 2013/0175343 A1 | 7/2013 | Good |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0287258 A1 | 10/2013 | Kearney |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306731 A1 | 11/2013 | Pedraro |
| 2013/0307964 A1 | 11/2013 | Bremer et al. |
| 2013/0308625 A1 | 11/2013 | Corcoran |
| 2013/0313324 A1 | 11/2013 | Koziol et al. |
| 2013/0313325 A1 | 11/2013 | Wilz et al. |
| 2013/0342717 A1 | 12/2013 | Havens et al. |
| 2014/0001267 A1 | 1/2014 | Giordano et al. |
| 2014/0002828 A1 | 1/2014 | Laffargue et al. |
| 2014/0008439 A1 | 1/2014 | Wang |
| 2014/0025584 A1 | 1/2014 | Liu et al. |
| 2014/0034734 A1 | 2/2014 | Sauerwein |
| 2014/0036848 A1 | 2/2014 | Pease et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1 | 2/2014 | Laffargue et al. |
| 2014/0061306 A1 | 3/2014 | Wu et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |
| 2014/0098792 A1 | 4/2014 | Wang et al. |
| 2014/0100774 A1 | 4/2014 | Showering |
| 2014/0100813 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Li et al. |
| 2014/0104451 A1 | 4/2014 | Todeschini et al. |
| 2014/0106594 A1 | 4/2014 | Skvoretz |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0121438 A1 | 5/2014 | Kearney |
| 2014/0121445 A1 | 5/2014 | Ding et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |
| 2014/0129378 A1 | 5/2014 | Richardson |
| 2014/0131441 A1 | 5/2014 | Nahill et al. |
| 2014/0131443 A1 | 5/2014 | Smith |
| 2014/0131444 A1 | 5/2014 | Wang |
| 2014/0131448 A1 | 5/2014 | Xian et al. |

(56) References Cited

U.S. PATENT DOCUMENTS

| | | |
|---|---|---|
| 2014/0133379 A1 | 5/2014 | Wang et al. |
| 2014/0136208 A1 | 5/2014 | Maltseff et al. |
| 2014/0140585 A1 | 5/2014 | Wang |
| 2014/0151453 A1 | 6/2014 | Meier et al. |
| 2014/0152882 A1 | 6/2014 | Samek et al. |
| 2014/0158770 A1 | 6/2014 | Sevier et al. |
| 2014/0159869 A1 | 6/2014 | Zumsteg et al. |
| 2014/0166755 A1 | 6/2014 | Liu et al. |
| 2014/0166757 A1 | 6/2014 | Smith |
| 2014/0166759 A1 | 6/2014 | Liu et al. |
| 2014/0168787 A1 | 6/2014 | Wang et al. |
| 2014/0175165 A1 | 6/2014 | Havens et al. |
| 2014/0175172 A1 | 6/2014 | Jovanovski et al. |
| 2014/0191644 A1 | 7/2014 | Chaney |
| 2014/0191913 A1 | 7/2014 | Ge et al. |
| 2014/0197238 A1 | 7/2014 | Lui et al. |
| 2014/0197239 A1 | 7/2014 | Havens et al. |
| 2014/0197304 A1 | 7/2014 | Feng et al. |
| 2014/0203087 A1 | 7/2014 | Smith et al. |
| 2014/0204268 A1 | 7/2014 | Grunow et al. |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0231500 A1 | 8/2014 | Ehrhart et al. |
| 2014/0232930 A1 | 8/2014 | Anderson |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0270196 A1 | 9/2014 | Braho et al. |
| 2014/0270229 A1 | 9/2014 | Braho |
| 2014/0278387 A1 | 9/2014 | DiGregorio |
| 2014/0282210 A1 | 9/2014 | Bianconi |
| 2014/0284384 A1 | 9/2014 | Lu et al. |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0312121 A1 | 10/2014 | Lu et al. |
| 2014/0319220 A1 | 10/2014 | Coyle |
| 2014/0319221 A1 | 10/2014 | Oberpriller et al. |
| 2014/0326787 A1 | 11/2014 | Barten |
| 2014/0332590 A1 | 11/2014 | Wang et al. |
| 2014/0344943 A1 | 11/2014 | Todeschini et al. |
| 2014/0346233 A1 | 11/2014 | Liu et al. |
| 2014/0351317 A1 | 11/2014 | Smith et al. |
| 2014/0353373 A1 | 12/2014 | Van Horn et al. |
| 2014/0361073 A1 | 12/2014 | Qu et al. |
| 2014/0361082 A1 | 12/2014 | Xian et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2015/0001301 A1 | 1/2015 | Ouyang |
| 2015/0001304 A1 | 1/2015 | Todeschini |
| 2015/0003673 A1 | 1/2015 | Fletcher |
| 2015/0009338 A1 | 1/2015 | Laffargue et al. |
| 2015/0009610 A1 | 1/2015 | London et al. |
| 2015/0014416 A1 | 1/2015 | Kotlarsky et al. |
| 2015/0021397 A1 | 1/2015 | Rueblinger et al. |
| 2015/0028102 A1 | 1/2015 | Ren et al. |
| 2015/0028103 A1 | 1/2015 | Jiang |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0039309 A1 | 2/2015 | Braho et al. |
| 2015/0040378 A1 | 2/2015 | Saber et al. |
| 2015/0048168 A1 | 2/2015 | Fritz et al. |
| 2015/0049347 A1 | 2/2015 | Laffargue et al. |
| 2015/0051992 A1 | 2/2015 | Smith |
| 2015/0053766 A1 | 2/2015 | Havens et al. |
| 2015/0053768 A1 | 2/2015 | Wang et al. |
| 2015/0053769 A1 | 2/2015 | Thuries et al. |
| 2015/0062366 A1 | 3/2015 | Liu et al. |
| 2015/0063215 A1 | 3/2015 | Wang |
| 2015/0063676 A1 | 3/2015 | Lloyd et al. |
| 2015/0069130 A1 | 3/2015 | Gannon |
| 2015/0071818 A1 | 3/2015 | Todeschini |
| 2015/0083800 A1 | 3/2015 | Li et al. |
| 2015/0086114 A1 | 3/2015 | Todeschini |
| 2015/0088522 A1 | 3/2015 | Hendrickson et al. |
| 2015/0096872 A1 | 4/2015 | Woodburn |
| 2015/0099557 A1 | 4/2015 | Pettinelli et al. |
| 2015/0100196 A1 | 4/2015 | Hollifield |
| 2015/0102109 A1 | 4/2015 | Huck |
| 2015/0115035 A1 | 4/2015 | Meier et al. |
| 2015/0127791 A1 | 5/2015 | Kosecki et al. |
| 2015/0128116 A1 | 5/2015 | Chen et al. |
| 2015/0129659 A1 | 5/2015 | Feng et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0136854 A1 | 5/2015 | Lu et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0144701 A1 | 5/2015 | Xian et al. |
| 2015/0149946 A1 | 5/2015 | Benos et al. |
| 2015/0161429 A1 | 6/2015 | Xian |
| 2015/0169925 A1 | 6/2015 | Chang et al. |
| 2015/0169929 A1 | 6/2015 | Williams et al. |
| 2015/0186703 A1 | 7/2015 | Chen et al. |
| 2015/0193644 A1 | 7/2015 | Kearney et al. |
| 2015/0193645 A1 | 7/2015 | Colavito et al. |
| 2015/0199957 A1 | 7/2015 | Funyak et al. |
| 2015/0204671 A1 | 7/2015 | Showering |

FOREIGN PATENT DOCUMENTS

| | | |
|---|---|---|
| WO | 2007118030 A2 | 10/2007 |
| WO | 2007118032 A2 | 10/2007 |
| WO | 2013163789 A1 | 11/2013 |
| WO | 2013173985 A1 | 11/2013 |
| WO | 2014019130 A1 | 2/2014 |
| WO | 2014110495 A1 | 7/2014 |

OTHER PUBLICATIONS

U.S. Appl. No. 14/462,801 for Mobile Computing Device With Data Cognition Software, filed Aug. 19, 2014 (Todeschini et al.); 38 pages.

U.S. Appl. No. 14/724,134 for Electronic Device With Wireless Path Selection Capability filed May 28, 2015 (Wang et al.); 42 pages.

U.S. Appl. No. 14/277,337 for Multipurpose Optical Reader, filed May 14, 2014 (Jovanovski et al.); 59 pages.

U.S. Appl. No. 14/200,405 for Indicia Reader for Size-Limited Applications filed Mar. 7, 2014 (Feng et al.); 42 pages.

U.S. Appl. No. 14/724,849 for Method of Programming the Default Cable Interface Software in an Indicia Reading Device filed May 29, 2015 (Barten); 29 pages.

U.S. Appl. No. 14/446,391 for Multifunction Point of Sale Apparatus With Optical Signature Capture filed Jul. 30, 2014 (Good et al.); 37 pages.

U.S. Appl. No. 14/722,608 for Interactive User Interface for Capturing a Document in an Image Signal filed May 27, 2015 (Showering et al.); 59 pages.

U.S. Appl. No. 29/528,890 for Mobile Computer Housing filed Jun. 2, 2015 (Fitch et al.); 61 pages.

U.S. Appl. No. 14/614,796 for Cargo Apportionment Techniques filed Feb. 5, 2015 (Morton et al.); 56 pages.

U.S. Appl. No. 29/516,892 for Table Computer filed Feb. 6, 2015 (Bidwell et al.); 13 pages.

U.S. Appl. No. 29/523,098 for Handle for a Tablet Computer filed Apr. 7, 2015 (Bidwell et al.); 17 pages.

U.S. Appl. No. 14/578,627 for Safety System and Method filed Dec. 22, 2014 (Ackley et al.); 32 pages.

U.S. Appl. No. 14/573,022 for Dynamic Diagnostic Indicator Generation filed Dec. 17, 2014 (Goldsmith); 43 pages.

U.S. Appl. No. 14/724,908 for Imaging Apparatus Having Imaging Assembly filed May 29, 2015 (Barber et al.); 39 pages.

(56) References Cited

OTHER PUBLICATIONS

U.S. Appl. No. 14/519,195 for Handheld Dimensioning System With Feedback filed Oct. 21, 2014 (Laffargue et al.); 39 pages.
U.S. Appl. No. 14/519,211 for System and Method for Dimensioning filed Oct. 21, 2014 (Ackley et al.); 33 pages.
U.S. Appl. No. 14/519,233 for Handheld Dimensioner With Data-Quality Indication filed Oct. 21, 2014 (Laffargue et al.); 36 pages.
U.S. Appl. No. 14/679,275 for Dimensioning System Calibration Systems and Methods filed Apr. 6, 2015 (Laffargue et al.); 47 pages.
U.S. Appl. No. 14/744,633 for Imaging Apparatus Comprising Image Sensor Array Having Shared Global Shutter Circuitry filed Jun. 19, 2015 (Wang); 65 pages.
U.S. Appl. No. 29/528,590 for Electronic Device filed May 29, 2015 (Fitch et al.); 9 pages.
U.S. Appl. No. 14/519,249 for Handheld Dimensioning System With Measurement-Conformance Feedback filed Oct. 21, 2014 (Ackley et al.); 36 pages.
U.S. Appl. No. 14/744,836 for Cloud-Based System for Reading of Decodable Indicia filed Jun. 19, 2015 (Todeschini et al.); 26 pages.
U.S. Appl. No. 14/398,542 for Portable Electronic Devices Having a Separate Location Trigger Unit for Use in Controlling an Application Unit filed Nov. 3, 2014 (Bian et al.); 22 pages.
U.S. Appl. No. 14/405,278 for Design Pattern for Secure Store filed Mar. 9, 2015 (Zhu et al.); 23 pages.
U.S. Appl. No. 14/745,006 for Selective Output of Decoded Message Data filed Jun. 19, 2015 (Todeschini et al.); 36 pages.
U.S. Appl. No. 14/568,305 for Auto-Contrast Viewfinder for an Indicia Reader filed Dec. 12, 2014 (Todeschini); 29 pages.
U.S. Appl. No. 29/526,918 for Charging Base filed May 14, 2015 (Fitch et al.); 10 pages.
U.S. Appl. No. 14/580,262 for Media Gate for Thermal Transfer Printers filed Dec. 23, 2014 (Bowles); 36 pages.
U.S. Appl. No. 14/590,024 for Shelving and Package Locating Systems for Delivery Vehicles filed Jan. 6, 2015 (Payne); 31 pages.
U.S. Appl. No. 29/519,017 for Scanner filed Mar. 2, 2015 (Zhou et al.); 11 pages.
U.S. Appl. No. 14/748,446 for Cordless Indicia Reader With a Multifunction Coil for Wireless Charging and EAS Deactivation, filed Jun. 24, 2015 (Xie et al.); 34 pages.
U.S. Appl. No. 14/529,857 for Barcode Reader With Security Features filed Oct. 31, 2014 (Todeschini et al.); 32 pages.
U.S. Appl. No. 29/528,165 for In-Counter Barcode Scanner filed May 27, 2015 (Oberpriller et al.); 13 pages.
U.S. Appl. No. 14/662,922 for Multifunction Point of Sale System filed Mar. 19, 2015 (Van Horn et al.); 41 pages.
U.S. Appl. No. 14/596,757 for System and Method for Detecting Barcode Printing Errors filed Jan. 14, 2015 (Ackley); 41 pages.
U.S. Appl. No. 14/533,319 for Barcode Scanning System Using Wearable Device With Embedded Camera filed Nov. 5, 2014 (Todeschini); 29 pages.
U.S. Appl. No. 14/519,179 for Dimensioning System With Multipath Interference Mitigation filed Oct. 21, 2014 (Thuries et al.); 30 pages.
U.S. Appl. No. 14/264,173 for Autofocus Lens System for Indicia Readers filed Apr. 29, 2014, (Ackley et al.); 39 pages.
U.S. Appl. No. 14/453,019 for Dimensioning System With Guided Alignment, filed Aug. 6, 2014 (Li et al.); 31 pages.
U.S. Appl. No. 14/452,697 for Interactive Indicia Reader , filed Aug. 6, 2014, (Todeschini); 32 pages.
U.S. Appl. No. 14/231,898 for Hand-Mounted Indicia-Reading Device with Finger Motion Triggering filed Apr. 1, 2014 (Van Horn et al.); 36 pages.
U.S. Appl. No. 14/715,916 for Evaluating Image Values filed May 19, 2015 (Ackley); 60 pages.
U.S. Appl. No. 14/513,808 for Identifying Inventory Items in a Storage Facility filed Oct. 14, 2014 (Singel et al.); 51 pages.
U.S. Appl. No. 29/458,405 for an Electronic Device, filed Jun. 19, 2013 (Fitch et al.); 22 pages.
U.S. Appl. No. 29/459,620 for an Electronic Device Enclosure, filed Jul. 2, 2013 (London et al.); 21 pages.

U.S. Appl. No. 14/483,056 for Variable Depth of Field Barcode Scanner filed Sep. 10, 2014 (McCloskey et al.); 29 pages.
U.S. Appl. No. 14/531,154 for Directing an Inspector Through an Inspection filed Nov. 3, 2014 (Miller et al.); 53 pages.
U.S. Appl. No. 29/525,068 for Tablet Computer With Removable Scanning Device filed Apr. 27, 2015 (Schulte et al.); 19 pages.
U.S. Appl. No. 29/468,118 for an Electronic Device Case, filed Sep. 26, 2013 (Oberpriller et al.); 44 pages.
U.S. Appl. No. 14/340,627 for an Axially Reinforced Flexible Scan Element, filed Jul. 25, 2014 (Reublinger et al.); 41 pages.
U.S. Appl. No. 14/676,327 for Device Management Proxy for Secure Devices filed Apr. 1, 2015 (Yeakley et al.); 50 pages.
U.S. Appl. No. 14/257,364 for Docking System and Method Using Near Field Communication filed Apr. 21, 2014 (Showering); 31 pages.
U.S. Appl. No. 14/327,827 for a Mobile-Phone Adapter for Electronic Transactions, filed Jul. 10, 2014 (Hejl); 25 pages.
U.S. Appl. No. 14/334,934 for a System and Method for Indicia Verification, filed Jul. 18, 2014 (Hejl); 38 pages.
U.S. Appl. No. 29/530,600 for Cyclone filed Jun. 18, 2015 (Vargo et al); 16 pages.
U.S. Appl. No. 14/707,123 for Application Independent DEX/UCS Interface filed May 8, 2015 (Pape); 47 pages.
U.S. Appl. No. 14/283,282 for Terminal Having Illumination and Focus Control filed May 21, 2014 (Liu et al.); 31 pages.
U.S. Appl. No. 14/619,093 for Methods for Training a Speech Recognition System filed Feb. 11, 2015 (Pecorari); 35 pages.
U.S. Appl. No. 29/524,186 for Scanner filed Apr. 17, 2015 (Zhou et al.); 17 pages.
U.S. Appl. No. 14/705,407 for Method and System to Protect Software-Based Network-Connected Devices From Advanced Persistent Threat filed May 6, 2015 (Hussey et al.); 42 pages.
U.S. Appl. No. 14/614,706 for Device for Supporting an Electronic Tool on a User's Hand filed Feb. 5, 2015 (Oberpriller et al.); 33 pages.
U.S. Appl. No. 14/628,708 for Device, System, and Method for Determining the Status of Checkout Lanes filed Feb. 23, 2015 (Todeschini); 37 pages.
U.S. Appl. No. 14/704,050 for Intermediate Linear Positioning filed May 5, 2015 (Charpentier et al.); 60 pages.
U.S. Appl. No. 14/529,563 for Adaptable Interface for a Mobile Computing Device filed Oct. 31, 2014 (Schoon et al.); 36 pages.
U.S. Appl. No. 14/705,012 for Hands-Free Human Machine Interface Responsive to a Driver of a Vehicle filed May 6, 2015 (Fitch et al.); 44 pages.
U.S. Appl. No. 14/715,672 for Augumented Reality Enabled Hazard Display filed May 19, 2015 (Venkatesha et al.); 35 pages.
U.S. Appl. No. 14/695,364 for Medication Management System filed Apr. 24, 2015 (Sewell et al.); 44 pages.
U.S. Appl. No. 14/664,063 for Method and Application for Scanning a Barcode With a Smart Device While Continuously Running and Displaying an Application on the Smart Device Display filed Mar. 20, 2015 (Todeschini); 37 pages.
U.S. Appl. No. 14/735,717 for Indicia-Reading Systems Having an Interface With a User's Nervous System filed Jun. 10, 2015 (Todeschini); 39 pages.
U.S. Appl. No. 14/527,191 for Method and System for Recognizing Speech Using Wildcards in an Expected Response filed Oct. 29, 2014 (Braho et al.); 45 pages.
U.S. Appl. No. 14/702,110 for System and Method for Regulating Barcode Data Injection Into a Running Application on a Smart Device filed May 1, 2015 (Todeschini et al.); 38 pages.
U.S. Appl. No. 14/535,764 for Concatenated Expected Responses for Speech Recognition filed Nov. 7, 2014 (Braho et al.); 51 pages.
U.S. Appl. No. 14/687,289 for System for Communication via a Peripheral Hub filed Apr. 15, 2015 (Kohtz et al.); 37 pages.
U.S. Appl. No. 14/747,197 for Optical Pattern Projector filed Jun. 23, 2015 (Thuries et al.); 33 pages.
U.S. Appl. No. 14/674,329 for Aimer for Barcode Scanning filed Mar. 31, 2015 (Bidwell); 36 pages.
U.S. Appl. No. 14/702,979 for Tracking Battery Conditions filed May 4, 2015 (Young et al.); 70 pages.

(56) References Cited

OTHER PUBLICATIONS

U.S. Appl. No. 29/529,441 for Indicia Reading Device filed Jun. 8, 2015 (Zhou et al.); 14 pages.
U.S. Appl. No. 14/747,490 for Dual-Projector Three-Dimensional Scanner filed Jun. 23, 2015 (Jovanovski et al.); 40 pages.
U.S. Appl. No. 14/740,320 for Tactile Switch for a Mobile Electronic Device filed Jun. 16, 2015 (Barndringa); 38 pages.
U.S. Appl. No. 14/695,923 for Secure Unattended Network Authentication filed Apr. 24, 2015 (Kubler et al.); 52 pages.
U.S. Appl. No. 14/740,373 for Calibrating a Volume Dimensioner filed Jun. 16, 2015 (Ackley et al.); 63 pages.
European Extended Search Report for related EP Application No. 15191528.7, dated April 22, 2016, 9 pages (commonly owned references have been cited on separate SB-08).
R. A. Cole et al.; Experiments with a spoken dialogue system for taking the US census; Elsevier Science Publishers, Amsterdam, NL; vol. 23 No. 3 Speech Communication; dated Nov. 1, 1997, pp. 243-260.
Zavaliagkos et al.: "Using Untranscribed Training Data to Improve Performance," ICSLP 98; 5th International Conference on Spoken Language Processing. (Incorporating 7th Australian International Speech Science and Technology Conference). Sydney Australia, Nov. 30-Dec. 4, 1998; International Conference on Spoken Language Proc, Oct. 1, 1998, p. p 1007 (4 pages total).
Yu Dong et al.; "Calibration of Confindence Measures in Speech Recognition", IEEE Transcations on Audio, Speech and Luguage Processing, IEEE Service Ceter, New York, NY; vol. 19, No. 8; dated Nov. 1, 2011 pp. 2461-2473.
European Extended Search Report for related EP Application No. 15192854, dated Apr. 22, 2016, 8 pages (commonly owned references have been cited on separate SB-08).
Office Action in related European Application No. 15191528.7 dated Nov. 24, 2017, pp. 1-5.

\* cited by examiner

METHOD AND SYSTEM FOR RECOGNIZING SPEECH USING WILDCARDS IN AN EXPECTED RESPONSE

FIELD OF THE INVENTION

The present invention relates to speech recognition and, more particularly, to adaptable systems configured to use expected responses with wildcards for recognizing speech.

BACKGROUND

Speech recognition has simplified many tasks in the workplace by permitting a hands-free exchange of information. A worker may receive voice commands through a headset speaker and transmit spoken responses via a headset microphone. The headset may be attached to a mobile computing device, the combination forming a wireless, wearable terminal. Industries, such as inventory management, especially benefit from the hands-free and wireless aspects of these devices.

The inventory-management industry relies on computerized inventory-management systems to aid with various functions. An inventory-management system typically includes a central computer in communication with the wireless, wearable terminals. Workers, wearing the wireless wearable terminals interface with the central computer while performing various tasks (e.g., order filling, stocking, and picking). For example, as a worker is assigned a task, appropriate information is translated into voice instructions and is transmitted to the worker via a headset. As the worker completes the task, the worker may respond into the headset's microphone. In this way, the workers may pose questions and/or report progress and working conditions (e.g., inventory shortages). The wireless, wearable terminal using speech recognition, allows a worker to perform tasks virtually hands-free, improving speed, accuracy, and efficiency.

In an exemplary workflow, the central computer may send voice messages welcoming the worker to the inventory management system and then assigning the worker a particular task (e.g., loading a truck). The system then vocally directs the worker to a particular aisle and bin, and directs the worker to pick a quantity of an item. Upon completing the pick task, the worker vocally confirms the location and the number of picked items. The system may then direct the worker to load the items onto a truck at a particular loading dock. Again, the user responds with feedback at various times during the process. The communications exchanged between the wireless-wearable terminal and the central computer can be task-specific and highly variable.

Good speech recognition is necessary for this work to be performed efficiently. A speech recognizer uses algorithms running on an integrated processor to analyze received speech input and determine the likely word, or words, that were spoken (i.e., form a hypothesis). As part of the hypothesis formulation, the speech recognizer assigns confidence scores that quantitatively indicate how confident the recognizer is that its hypothesis is correct. If the confidence score is above an acceptance threshold, then the speech recognizer accepts the hypothesis as recognized speech. If, however, the confidence score is below the acceptance threshold, then the speech recognizer considers the speech not recognized (e.g., background noise). This rejection may require the user to repeat the speech input. If the acceptance threshold is too high, then correct speech with a low confidence score may be rejected unnecessarily. These unnecessary rejections may reduce productivity and efficiency.

A speech recognizer that utilizes an expected response to adjust the acceptance threshold has been disclosed (e.g., U.S. Pat. No. 7,865,362). Here, however, the expected response is limited to expected responses known in their entirety and does not support specifying the partial knowledge of an expected response. Therefore, a need exists for a speech recognizer that accepts a more generalized expected response for modifying the behavior of the speech recognition system to improve recognition accuracy.

SUMMARY

Accordingly, in one aspect, the present invention embraces a method for adjusting an acceptance threshold in a speech recognition system. The method includes the step of receiving a speech input using a computing device that has at least one processor and a memory. The processor processes the speech input to derive a sequence of hypothesized (i.e., hypothesis) words embodying a hypothesis. Each hypothesis word is associated with a confidence score. An expected response composed of a sequence of expected words and at least one wildcard word is retrieved from memory and compared to the hypothesis on a word-by-word basis. Based on the results of this comparison, an acceptance threshold for each hypothesis word is adjusted.

In an exemplary embodiment, when a word from the hypothesis matches its corresponding expected word in the expected response, then the acceptance threshold for the hypothesis word is adjusted by an exact-match adjustment amount.

In another exemplary embodiment, when a word from the hypothesis corresponds to a wildcard word in the expected response, then the acceptance threshold for the hypothesis word is adjusted by a wildcard-match adjustment amount.

In another exemplary embodiment, the wildcard-match adjustment amount and the exact-match adjustment amount are not the same amount. In addition, for some embodiments, the threshold adjustment amount may be zero (i.e., no threshold adjustment) for all hypothesis words when a word in the hypothesis does not match its corresponding expected word.

In another exemplary embodiment, the speech recognizer compares the confidence score of the hypothesis word to the acceptance threshold in order to accept or reject the word as recognized speech. In some exemplary embodiments, the hypothesis word is accepted when the confidence score of a hypothesis word exceeds the acceptance threshold.

In another aspect, the present invention embraces a method for adapting models for a speech recognition system. The method includes the step of receiving a speech input using a computing device that has at least one processor and a memory. The processor, running speech recognition algorithms, derives a hypothesis including a sequence of hypothesis words. An expected response is retrieved from memory and includes a sequence of at least one expected word and at least one wildcard word. The hypothesis words in the hypothesis and the expected words or wildcard words in the expected response are compared word-by-word in sequence. If a hypothesis matches the expected response, then the hypothesis words are marked as suitable for use in adaptation. The models corresponding to the words in the hypothesis that were marked suitable for adaptation are adapted using the acoustic data corresponding to the marked hypothesis words.

In an exemplary embodiment, a hypothesis word that corresponds to a wildcard word in the expected response is marked not suitable for adaptation. Features corresponding to a particular hypothesis that are marked as not suitable for adaptation will not be used to update the model of that word. For example, if the hypothesis is '1 2 1' and the final '1' was not suitable for adaptation, then the features corresponding to the first '1' would be used to update the model for '1' and those corresponding to the final instance would not.

In another exemplary embodiment, a hypothesis word in the hypothesis that does not match its corresponding expected word in the expected response causes all words in the hypothesis to be marked as not suitable for adaptation. Models corresponding to hypothesis words marked not suitable for adaptation are not adapted.

In another aspect, the present invention embraces a system for recognizing speech. The system includes a speech input device for gathering speech input. The system also includes a computing device with a processor and a memory that are configured to execute (i) a recognition algorithm, (ii) a threshold-adjustment algorithm, and (iii) an acceptance algorithm. The recognition algorithm assesses the speech input using a library of models stored in the memory to generate (i) a hypothesis including hypothesis words and (ii) a confidence score associated with one or more hypothesis words. The threshold-adjustment algorithm adjusts an acceptance threshold corresponding to a hypothesis word if the hypothesis matches an expected response stored in the memory and where a wildcard word in the expected response can match any word in the same position in the hypothesis. The expected response includes at least one expected word and at least one wildcard word. The acceptance algorithm accepts a hypothesis word when the hypothesis word's confidence score exceeds the hypothesis word's acceptance threshold.

In an exemplary embodiment, the amount of acceptance threshold adjustment is different for hypothesis words that match corresponding expected words than for hypothesis words that correspond to wildcard words. In some embodiments, this adjustment is a reduction of the acceptance threshold, wherein the reduction is greater for hypothesis words corresponding to expected words than it is for hypothesis words corresponding to wildcard words. In another embodiment, the difference in the acceptance threshold adjustment between hypothesis words corresponding to expected words and hypothesis words corresponding to wildcards may be affected by the matching conditions between other words in the hypothesis and their corresponding expected words (or wildcard words).

In yet another aspect, the present invention embraces a system for recognizing speech. The system includes a speech input device for gathering speech input. The system also includes a computing device including a processor and a memory. The processor and memory are configured to execute a recognition algorithm and a word-marking algorithm. The recognition algorithm assesses the speech input using a library of models stored in the memory to generate a hypothesis that includes hypothesis words. The word-marking algorithm compares each word of the hypothesis, in sequence, to an expected response stored in the memory that includes expected words and at least one wildcard word. The word-marking algorithm marks each hypothesis word that matches a corresponding expected word in the expected response as suitable for adaptation. The algorithm performs the marking step for all words in the hypothesis and then a model update algorithm adapts the models for a hypothesis word marked as usable for adaptation. The models are updated using the acoustic data corresponding to the marked words respectively.

The foregoing illustrative summary, as well as other exemplary objectives and/or advantages of the invention, and the manner in which the same are accomplished, are further explained within the following detailed description and its accompanying drawings.

DETAILED DESCRIPTION

Figure 1:
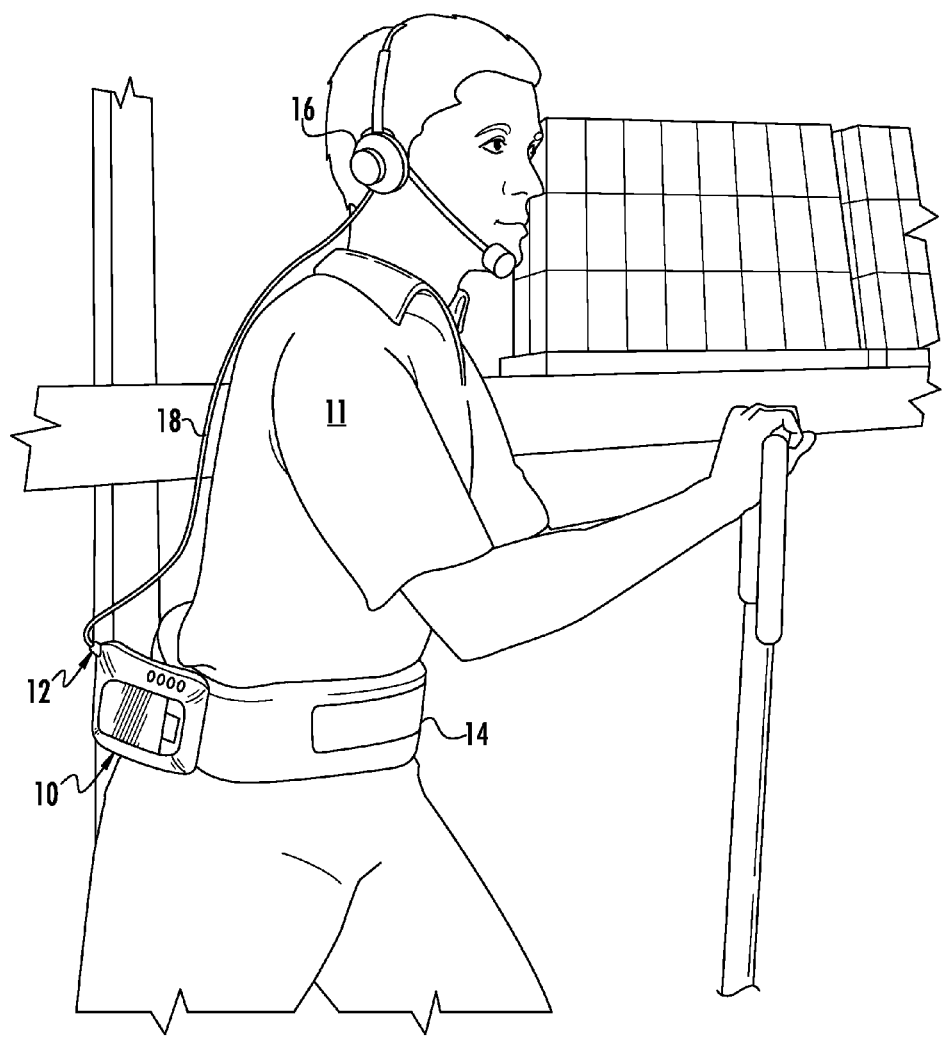
FIG. 1 illustrates a perspective view of a user using an exemplary speech recognition system in a typical work environment.

The present invention embraces a speech recognition system to allow a user to speak a response to queries or instructions as part of a workflow (e.g., warehouse operations). FIG. 1 illustrates a perspective view of a user with an exemplary speech recognition system. The speech recognition system may include a mobile computing device 10 and a speech input/output device (e.g., headset) 16. The mobile computing device 10 may be a wearable device, that is worn by a user 11 (e.g., on a belt 14). The mobile computing device 10 may include at least one processor and at least one non-transitory storage medium (i.e., memory) (e.g., read-only memory, flash memory, and/or a hard-drive). The processor may facilitate speech recognition and other associated processing (e.g., logic, input/output, power management, communication, etc.). The headset 16 may be coupled to the portable terminal by a cord 18 or by a wireless connection (e.g., near-field communication (NFC) or BLUETOOTH®). The headset may be worn on the head of the user 11. In some possible embodiments, the mobile computing device 10 may be integrated with the headset 16, eliminating the need for a separate mobile computing device 10.

A user speaks into the speech input device (e.g., microphone) of the headset 16, and the audio information is transferred to the mobile computing device. The processor in the mobile computing device may be configured to execute algorithms to recognize the speech. Alternatively, the host computer may be configured to execute the algorithms to recognize speech. In either case, the mobile computing device could communicate with the host computer wirelessly via a variety of protocols (e.g., IEEE 802.11, including WI-FI®, BLUETOOTH®, CDMA, TDMA, or GSM). U.S. patent application Ser. No. 10/671,142, entitled "Apparatus and Method for Detecting User Speech", incorporated herein by reference, further details the implementation of the system.

Typical to most voice data-entry applications (e.g., warehouse product picking/stocking) is the expectation of a user's response. In some dialogs, one or more particular responses, known as expected response(s), among the set of possible responses is known to be more likely than others are. These expected responses may be used by the speech recognition system to improve recognition accuracy. For example, an acceptance threshold used to prevent a background noise from being recognized as speech might be adjusted (e.g., lowered) if the hypothesis matches an expected response. In addition, a speech model (i.e., model) may be adapted (i.e., updated) differently depending on this match.

In some situations, only a partial knowledge of an expected response is known. For example, a portion of the expected response may be unknown or may cover a range of possible responses. Expanding the use of expected responses is made possible through the use of wildcard words. Wildcard words help reduce recognition errors resulting from responses that match an expected response but that would otherwise fail the acceptance threshold criteria.

Wildcard words are words in an expected response that match any recognized word in the corresponding position of a hypothesis. For example, a speech recognizer might hypothesize that "quantity three" was spoken. The word "quantity" is expected, but the word "three" is one possible response of many. In this exemplary situation, an expected response using a wildcard word to represent the word after "quantity" could expand the number of responses that match the expected response. For example, a speech input of "quantity three" or "quantity four" could both match the expected response due to the wildcard word. Using wildcards in this way expands the possible dialog constructs that could benefit from the described speech recognizer modifications and leads to an overall improved speech-recognition accuracy.

Figure 2:
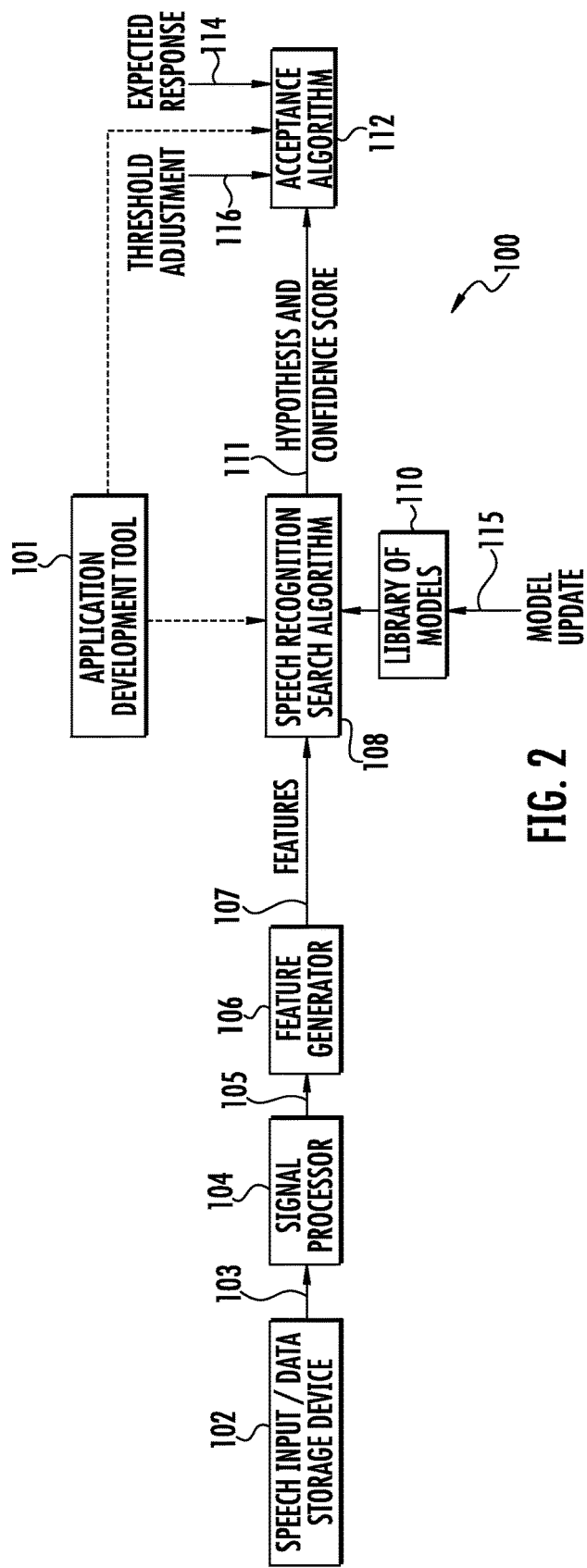
FIG. 2 illustrates a schematic view of an exemplary system for recognizing speech.

FIG. 2 illustrates a schematic view of a system for recognizing speech. Here, a speech input may be captured by a speech input device 102 in a variety of conventional ways. Typically, an electro-acoustical device (e.g., microphone) senses the speech input and converts it into an analog voltage signal 103 sent to a signal processor 104. The signal processor 104 may include analog-to-digital converters, filters, and equalization circuitry to convert the analog speech input 103 into a digitized stream of data 105. This digitized stream of data can be separated into separate units for analysis.

The signal processor 104 divides the digital stream of data into a sequence of time-slices, or frames 105, each of which is then processed by a feature generator 106, to produce features 107. A feature may be a vector, matrix, or otherwise organized set of numbers representing the acoustic features of the frames. The digitized speech input or any data derived from it that describe the acoustic properties of the speech input, such as the features 107, are known as acoustic data. Also, note that speech input may contain periods when the user is not speaking. Further explanation of an exemplary signal processor for speech is provided in U.S. Pat. No. 4,882,757, entitled "Speech Recognition System", which is incorporated, by reference, in its entirety. This patent discloses Linear Predictive Coding (LPC) coefficients to represent speech; however, other functionally equivalent methods are contemplated within the scope of the present invention.

A speech-recognition search algorithm 108, realized by a circuit or software program, analyzes the features 107 to determine a hypothesis that best matches the speech input 102. In an exemplary recognition algorithm, the speech recognition search algorithm 108 uses probabilistic models from a library of models 110 stored in memory to recognize the speech input 102. Some library models (i.e., models) may be user customized (i.e., updated) to a particular user, while some models may be generic to all users.

During normal operation, the speech-recognition search algorithm 108 assesses the features 107 generated in the feature generator 106 using reference representations of speech (i.e., models), in library 110 to determine the word (or words) (i.e., hypothesized words) that best matches the speech input from device 102. Confidence scores are generated to indicate how closely the sequence of features from the search algorithm 106 matches the models in library 110. A hypothesis, including one or more hypothesized words and their associated confidence scores 111, is directed to an acceptance algorithm 112. A confidence score for a hypothesized word is compared to an acceptance threshold. If the confidence score exceeds the acceptance threshold, then the hypothesized word is recognized as speech and is accepted by the acceptance algorithm 112. If, however, the confidence score is not above the acceptance threshold, then the acceptance algorithm 112 ignores (or rejects) the hypothesized word and in response, the system may prompt the user to repeat the speech input.

One common modeling technique utilized for speech recognition includes Hidden Markov Models (HMM). In speech recognition, these models use sequences of states to describe vocabulary items, which may be words, phrases, or sub-word units. Each state represents a portion of a word and outputs a probability to each observed feature vector. A path through the HMM states provides a probabilistic indication of a series of acoustic feature vectors. The models are searched such that different, competing hypotheses (or paths) are scored—a process known as acoustic matching or acoustic searching. A state S can be reached at a time T via several different paths. For each path reaching a particular state at a particular time, a path probability is calculated. Using the Viterbi algorithm, each path through the HMM can be assigned a probability. In particular, the best path can be assigned a probability. Furthermore, each vocabulary item or word in the best path can be assigned a probability. Each of these probabilities can be used as a confidence score or combined with other measurements, estimates, or numbers to derive a confidence score. The path with the highest probability or highest confidence score, the hypothesis, can then be further analyzed. The confidence score of the hypothesis or the confidence scores of each hypothesized word in the hypothesis can be compared with an acceptance threshold. As used herein, the term "word" is used to denote a vocabulary item, and thus may mean a word, a segment, or part of a word, or a compound word, such as "next slot" or "say again." Therefore, the term "word" is not limited to just a single word. It should also be understood that other speech recognition models are also contemplated within the scope of the present invention; for example, template matching dynamic time warping (DTW) and neural networks are two such exemplary, alternative modeling techniques.

A speech recognition system may assign confidence scores to hypothesized speech in a variety of ways. One way is to assign a single confidence score to an entire utterance (i.e., a continuous piece of speech beginning and ending with a clear pause), which may contain multiple words. The decision to accept or reject applies to all of the words corresponding to a confidence score. Another approach assigns confidence scores to parts of an utterance (e.g., words). In this case, the decision to accept or reject applies to the individual parts and their corresponding confidence scores. The invention disclosed herein may apply to speech recognizers that utilize either approach.

While existing speech recognition systems may adequately address generating speech features and recognizing the speech, there may still be drawbacks. For example, all of the hypotheses generated by the system, even the best-scoring hypothesis may have confidence scores that fall below the acceptance threshold. In this situation, the speech is rejected and may have to be repeated. Repeating speech input reduces productivity and efficiency of the user. Recognition accuracy and thus user productivity may be improved by using an expected response to modify the acceptance threshold.

U.S. Pat. No. 7,827,032, entitled "Method and Systems for Adapting a Model for a Speech Recognition System", which is hereby incorporated in its entirety by reference, discloses an exemplary method of using an expected response to modify an acceptance threshold. In the U.S. Pat. No. 7,827,032 patent, however, the entire expected response (i.e., every word of the expected response) is known. The present invention provides a method and system that improves upon this concept by permitting the use of wildcards as part of the expected response.

Figure 3:
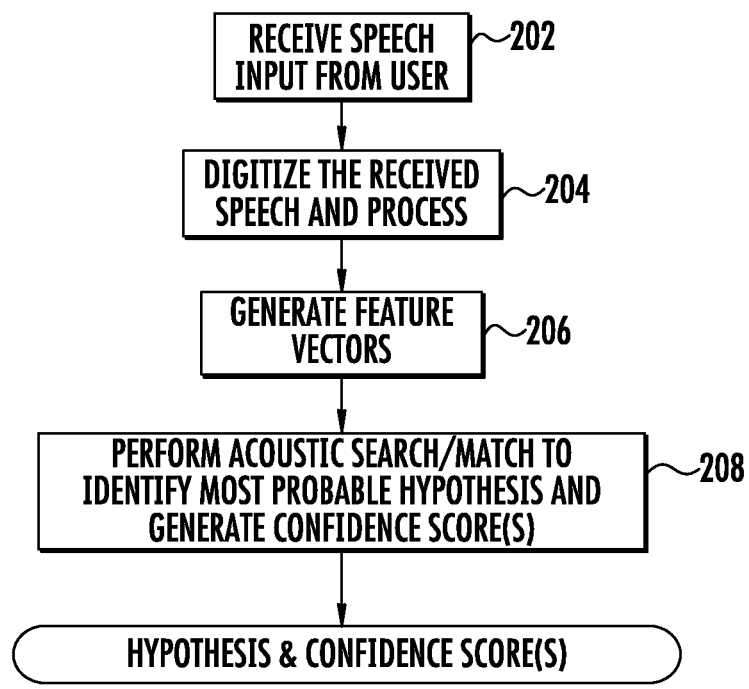
FIG. 3 illustrates a flowchart of an exemplary method for generating a hypothesis and confidence score(s) from speech input.

FIG. 3 illustrates a flowchart of an exemplary algorithm for generating a hypothesis and corresponding confidence score(s) from speech. In step 202, speech input is received from the user by an input device 102 (or is recalled from storage). The speech input is digitized in step 204 by a signal processor 104. The digitized speech is separated, in step 206, into time slices and converted into feature vectors, such as by the feature generator 106. These feature vectors correspond to information within an acoustic model that allows a search and match to be performed to identify the most likely, or most probable, sequence of words spoken by the user (i.e., hypothesis). Step 208 reflects the search/match routine to determine a hypothesis. Such a search/match routine may be performed utilizing the speech-recognition search algorithm 108 and model library 110 as shown in FIG. 2. The output of the speech recognition search algorithm is a hypothesis made up of hypothesis words (i.e., hypothesized words), wherein each hypothesis word has an associated confidence score 111. In some cases, one confidence score may be assigned to more than one word in the hypothesis.

Figure 4:
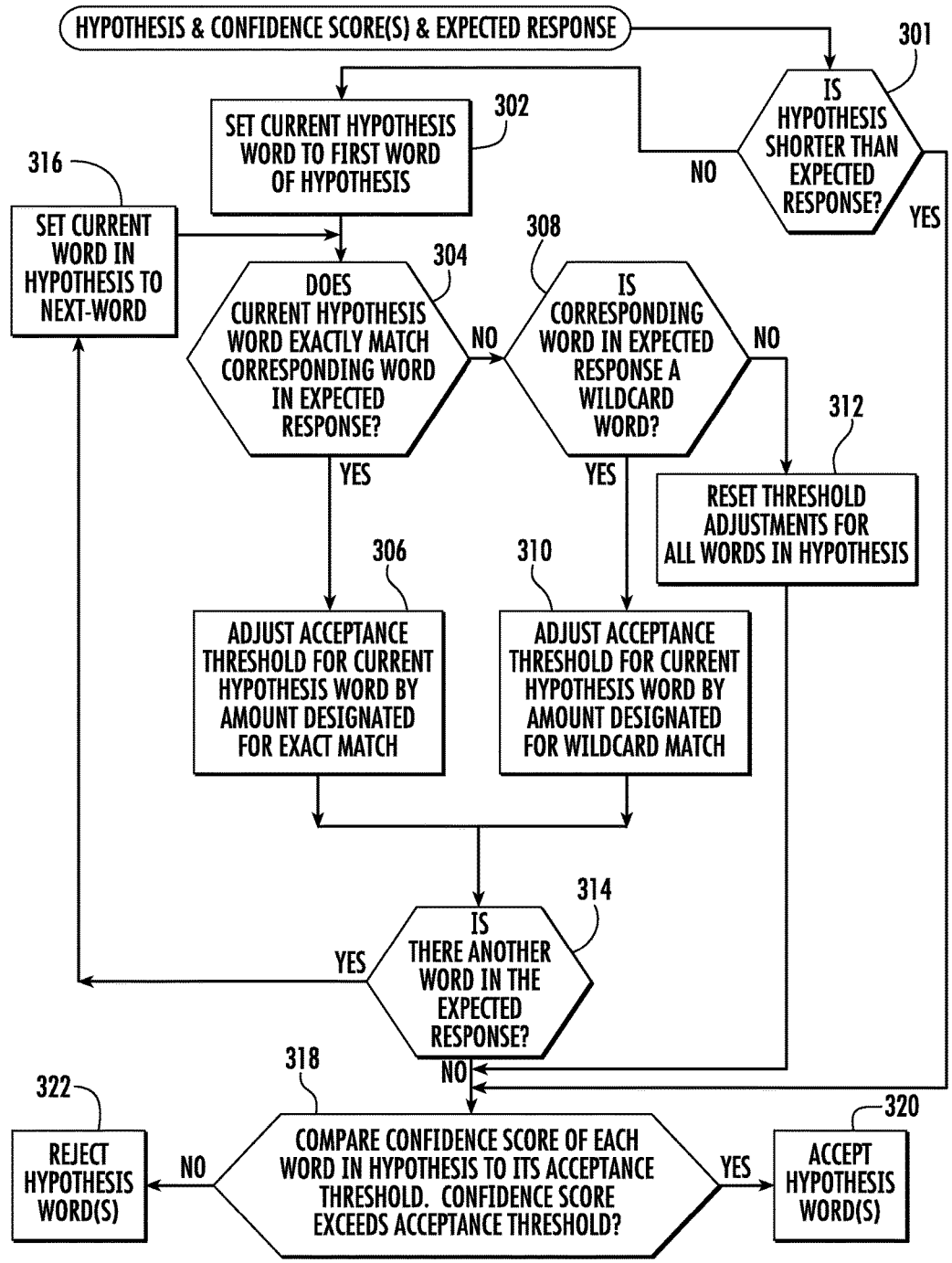
FIG. 4 illustrates a flowchart of an exemplary method for adjusting an acceptance threshold in a speech recognition system using expected responses with wildcard words.

The hypothesis and confidence score(s) are used by an acceptance algorithm as shown in FIG. 4. The acceptance algorithm is used to either accept or reject words in the hypothesis (i.e., hypothesis words) as accurately recognized. A fixed acceptance threshold may be used to compare the confidence score associated with hypothesis words but this approach may set the threshold too high, resulting in correctly hypothesized words being erroneously rejected. This is especially true when a hypothesized word matches an expected response. A better approach is to adjust an acceptance threshold based on the expected response. Further, including wildcard words in the expected response expands the possible responses that can be used to adjust the threshold and improve the speech recognition system's performance.

As shown in FIG. 4, a hypothesis is compared to the expected response 301, and a hypothesis that has at least as many words as the expected response is considered word-by-word starting by setting the current hypothesis word (i.e., the word to be examined) to the first hypothesis word 302. The acceptance algorithm compares the current hypothesis word to its corresponding word in the expected response 304, which in this case is the first word of the expected response. If the two words match then the acceptance threshold for the current hypothesis word is adjusted 306. If, however, the expected response word is a wildcard word, then any hypothesized word will match the wildcard 308, and the acceptance threshold for the current hypothesis word will be adjusted by a wildcard match amount 310. Typically, thresholds for hypothesis words matching expected words are reduced to make acceptance 320 easier. The amount of reduction (i.e., the exact-match adjustment amount) may depend on the application.

After the first word of the hypothesis is examined, the algorithm moves to the next word in the hypothesis and expected response 314. This next word is set as the current word 316. At this point, the algorithm again compares the current hypothesis word, which here is the second word of the hypothesis, to the corresponding expected word (i.e., the second word of the expected response). If the two words match, whether exactly or with a wildcard, then the threshold is adjusted as before.

The type and amount of the acceptance threshold adjustment may be configured to match the application. Typically, hypothesis words corresponding to wildcards will have their acceptance thresholds reduced but at an amount that is less than the amount for hypothesis words that match their corresponding expected words exactly.

The process of comparing hypothesis words to expected words continues word by word in sequence until the either a mismatch is found or until the end of the expected response is reached. If a hypothesis word is compared to its expected word and there is a mismatch, then the threshold adjustments for all of the words in the hypothesis up to that point are reset 312 and no further adjustment occurs. That is, each hypothesis word uses its default acceptance threshold.

After the acceptance threshold for all words in the hypothesis are set (either adjusted or not), each word in the hypothesis has its confidence score compared to the acceptance threshold 318. Words with confidence scores that exceed their corresponding acceptance threshold are accepted 320. Words with confidence scores that do not exceed their corresponding acceptance threshold are rejected 322.

An example of the use of the wildcard words described above is an instance where the expected response is "one two *", where "*" designates a wildcard word. In this case, a word is expected after "one two" but this word is not restricted or specified. If the hypothesis is "one two alpha", the confidence scores associated with the hypothesized words may be +1, −1, −0.5, respectively, and the acceptance thresholds may be 0,0,0, respectively, then according to the method described herein the acceptance threshold for the first word will be adjusted downward, to −2 for example, since the hypothesized word "one" matches the corresponding word "one" in the expected response. In addition, the acceptance threshold for the second word will be adjusted downward, again to −2, since the hypothesized second word "two" matches the corresponding word "two" in the expected response. Finally, the acceptance threshold for the third word will be adjusted downward by a different amount, to −1 for example, since the hypothesized word "alpha" matches a corresponding wildcard word. Now comparing the confidence scores to the adjusted acceptance thresholds, all three hypothesized words will be accepted.

Continuing with this example, if the hypothesis were "one three beta" and all the other aspects remain the same, none of the acceptance thresholds would be adjusted because the second hypothesized word "three" does not match the second word in the expected response "two". Consequently, the second and third hypothesized words, "three" and "beta", would be rejected since their confidence scores would be below the corresponding acceptance thresholds.

An expected response may also facilitate updating models for the speech recognition system. Here again wildcards may be used to increase the range of responses that may be used to improve speech recognition performance and improve user experience. As shown in FIG. 2, the speech recognition search algorithm 108 uses a library of models 110 (i.e., speech models) to create a hypothesis. The models stored may be updated to adapt the system to a user's particular speech (e.g., accent). Expected responses provide good opportunities for model adjustment. If a user inputs speech that is recognized and found to be matching an expected response then this speech may be considered as a sample of speech suitable for model adaptation.

Figure 5:
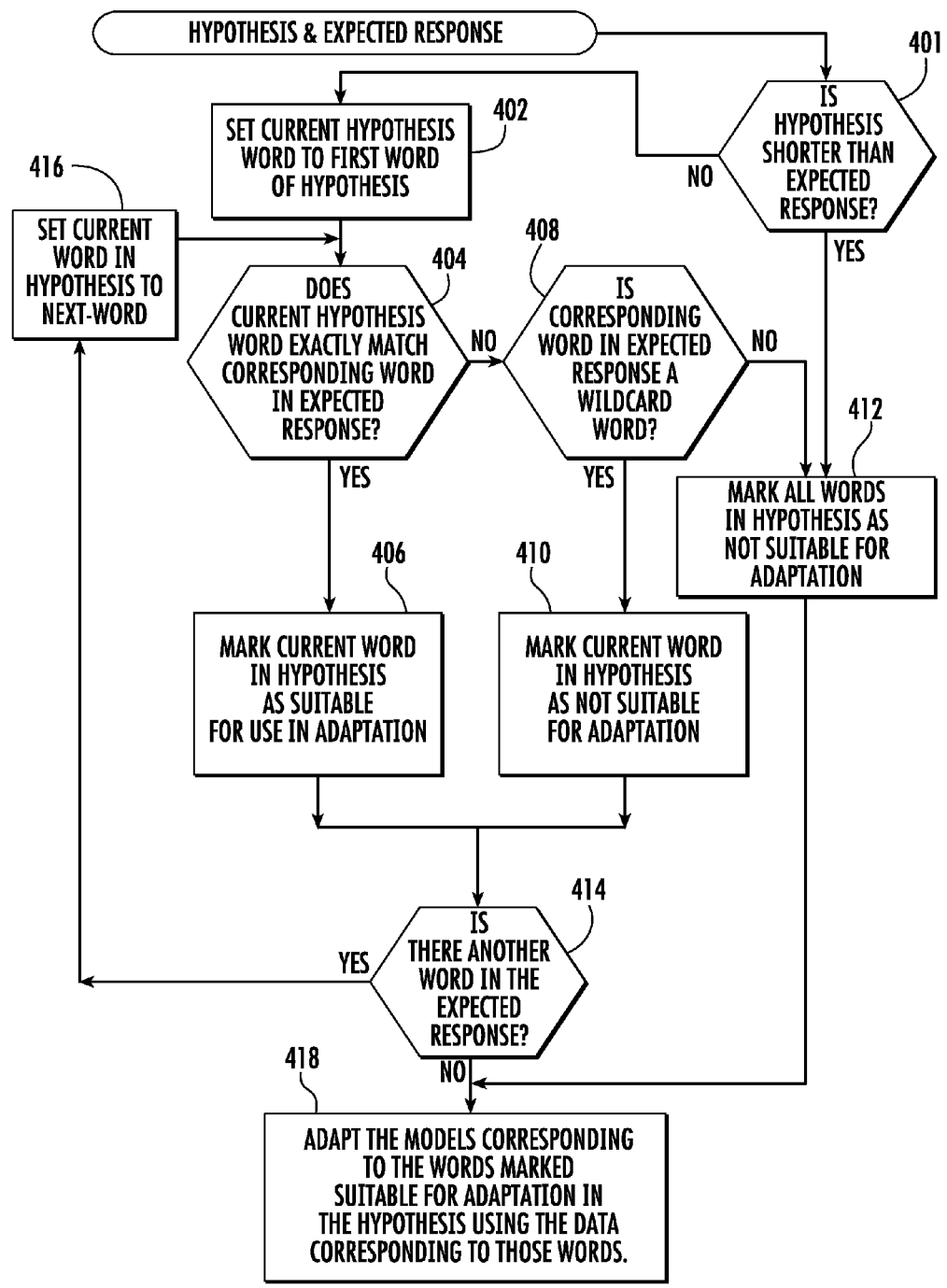
FIG. 5 illustrates a flowchart of an exemplary method for adapting models for a speech recognition system using expected responses with wildcard words.

FIG. 5 illustrates a flowchart of an exemplary method for adapting models for a speech recognition system. A hypothesis is compared to the expected response 401, and a hypothesis that has at least as many words as the expected response is examined word-by-word 402. The current word in the hypothesis is compared to its corresponding word in the expected response 404. If the current word in the expected response matches the corresponding hypothesis word, then this hypothesis word may be marked suitable for use in adaptation 406. In a preferred embodiment, only hypothesis words corresponding to expected words are used for adaptations. When a current hypothesis word corresponds to a wildcard word 408, then the current hypothesis word is marked as not suitable for adaptation 410. This word-by-word comparison continues 414, 416, 404 until the end of the expected response is reached, or until a mismatch between a hypothesis word and expected word is found. If a mismatch is found, then all words in the hypothesis are marked as not suitable for adaptation 412. After all words are marked (i.e., either suitable or not suitable), then the models corresponding to each word marked suitable for adaptation are updated 418 using that word's acoustic data. Note that that the model adaptation/update may be withheld until multiple hypotheses are analyzed to allow model adaptation to be performed in a batch using more data.

There are multiple ways to include knowledge about an expected response within a speech recognition application for the purposes of the invention. For example, when developing the software, the developer may include this information in tables or other data structures that are referenced at different points in the execution of the application. For example, the program may use knowledge of a workflow script to look for a specific numeric password or code. Additionally (or alternatively), the information about the expected result can be calculated dynamically using programming logic in the speech recognition application. For example, it is well known that the accuracy of a credit card number can be calculated based on a particular checksum algorithm. In such an example, the speech recognition program would not need to have all the checksums precalculated beforehand, but can implement the checksum algorithm to calculate a value on-the-fly as needed. In another example, the program may know the location (bin/slot) that will be visited next. From this, the program may deduce the check-digits to look for in the expected response. This on-the-fly information is still available as "prior knowledge" with which to evaluate the speech received from a user, and thus the present invention may use either (i) pre-stored expected responses or (ii) dynamically-developed expected responses. Referring to FIG. 2, the expected response 114 may be used by the acceptance algorithm and may be retrieved from memory or calculated dynamically by system 100 in order to compare it to the hypothesis.

The amount by which the acceptance threshold is adjusted can be determined in various ways according to embodiments of the invention. In one embodiment, the voice development tool or API used to implement system 100 can provide a means for the application developer to specify the adjustment amount. For example, a fixed amount of threshold adjustment 116 may be built into the system 100 and used by acceptance algorithm 112 as shown in FIG. 2. Alternatively, the recognition system or application can be configured to calculate an adjustment amount automatically to lessen the knowledge needed by the application developer and prevent inappropriate use of the features of the invention.

For example, in one embodiment, to guard against the expected response being accidentally produced and accepted by the recognition system, the adjustment of the acceptance threshold may be dynamically controlled by an algorithm that considers the likelihood of the recognition system accidentally producing the expected response. For example, in one such embodiment, the present invention contemplates at least two independent components of such a threshold adjustment algorithm: the number of vocabulary items at the point in the application where the expected response is used (the breadth of the search), and the number of vocabulary items in the expected response (the depth). For example, if there are only two possible responses (e.g., a "yes" or "no" response) with one being the expected response, then the adjustment to the acceptance threshold could be made very small or zero because the recognizer is looking for a single word answer (depth=1) from only two possibilities (breadth=2).

Alternatively, in such a scenario, the system 100 could be configured to provide no adjustment to the acceptance threshold, because with such a low depth and low breadth, there is a higher chance of the system producing the expected response by accident.

However, in another recognition scenario, if there are a hundred possible responses (e.g., a two-digit check-digit), then the probability of producing the expected response by accident would be smaller and the adjustment to the acceptance threshold, therefore, may be made more significant. For example, two check-digits will have a hundred possible responses making a breadth of 100 and a depth of two for the two check-digits. This would allow a more significant threshold adjustment to be used.

In another embodiment, the threshold adjustment may depend on how likely the user is to say the expected response. If, in a particular application, the user says the expected response 99% of the time, the threshold adjustment may be greater than in applications where the user's response is not as predictable.

In still another embodiment, the acceptance-threshold adjustment amount can also be determined by considering the "cost" of the recognizer making an error. A smaller adjustment would be used when the cost is greater, to prevent errors where an incorrect hypothesis is mistakenly recognized as the expected response.

\* \* \*

To supplement the present disclosure, this application incorporates entirely by reference the following commonly assigned patents, patent application publications, and patent applications:

U.S. Pat. Nos. 6,832,725; 7,128,266; 7,159,783; 7,413,127; 7,726,575; 8,294,969; 8,317,105; 8,322,622; 8,366,005; 8,371,507; 8,376,233; 8,381,979; 8,390,909; 8,408,464; 8,408,468; 8,408,469; 8,424,768; 8,448,863; 8,457,013; 8,459,557; 8,469,272; 8,474,712; 8,479,992; 8,490,877; 8,517,271; 8,523,076; 8,528,818; 8,544,737; 8,548,242; 8,548,420; 8,550,335; 8,550,354; 8,550,357; 8,556,174;

8,556,176; 8,556,177; 8,559,767; 8,599,957; 8,561,895; 8,561,903; 8,561,905; 8,565,107; 8,571,307; 8,579,200; 8,583,924; 8,584,945; 8,587,595; 8,587,697; 8,588,869; 8,590,789; 8,596,539; 8,596,542; 8,596,543; 8,599,271; 8,599,957; 8,600,158; 8,600,167; 8,602,309; 8,608,053; 8,608,071; 8,611,309; 8,615,487; 8,616,454; 8,621,123; 8,622,303; 8,628,013; 8,628,015; 8,628,016; 8,629,926; 8,630,491; 8,635,309; 8,636,200; 8,636,212; 8,636,215; 8,636,224; 8,638,806; 8,640,958; 8,640,960; 8,643,717; 8,646,692; 8,646,694; 8,657,200; 8,659,397; 8,668,149; 8,678,285; 8,678,286; 8,682,077; 8,687,282; 8,692,927; 8,695,880; 8,698,949; 8,717,494; 8,717,494; 8,720,783; 8,723,804; 8,723,904; 8,727,223; U.S. Pat. No. D702,237; 8,740,082; 8,740,085; 8,746,563; 8,750,445; 8,752,766; 8,756,059; 8,757,495; 8,760,563; 8,763,909; 8,777,108; 8,777,109; 8,779,898; 8,781,520; 8,783,573; 8,789,757; 8,789,758; 8,789,759; 8,794,520; 8,794,522; 8,794,526; 8,798,367; 8,807,431; 8,807,432; 8,820,630;
International Publication No. 2013/163789;
International Publication No. 2013/173985;
International Publication No. 2014/019130;
International Publication No. 2014/110495;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2011/0202554;
U.S. Patent Application Publication No. 2012/0111946;
U.S. Patent Application Publication No. 2012/0138685;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0056285;
U.S. Patent Application Publication No. 2013/0070322;
U.S. Patent Application Publication No. 2013/0075168;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0200158;
U.S. Patent Application Publication No. 2013/0256418;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0278425;
U.S. Patent Application Publication No. 2013/0287258;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306730;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0313325;
U.S. Patent Application Publication No. 2013/0341399;
U.S. Patent Application Publication No. 2013/0342717;
U.S. Patent Application Publication No. 2014/0001267;
U.S. Patent Application Publication No. 2014/0002828;
U.S. Patent Application Publication No. 2014/0008430;
U.S. Patent Application Publication No. 2014/0008439;
U.S. Patent Application Publication No. 2014/0025584;
U.S. Patent Application Publication No. 2014/0027518;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0042814;
U.S. Patent Application Publication No. 2014/0049120;
U.S. Patent Application Publication No. 2014/0049635;
U.S. Patent Application Publication No. 2014/0061305;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0075846;
U.S. Patent Application Publication No. 2014/0076974;
U.S. Patent Application Publication No. 2014/0078341;
U.S. Patent Application Publication No. 2014/0078342;
U.S. Patent Application Publication No. 2014/0078345;
U.S. Patent Application Publication No. 2014/0084068;
U.S. Patent Application Publication No. 2014/0097249;
U.S. Patent Application Publication No. 2014/0098792;
U.S. Patent Application Publication No. 2014/0100774;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0104451;
U.S. Patent Application Publication No. 2014/0106594;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0108682;
U.S. Patent Application Publication No. 2014/0110485;
U.S. Patent Application Publication No. 2014/0114530;
U.S. Patent Application Publication No. 2014/0124577;
U.S. Patent Application Publication No. 2014/0124579;
U.S. Patent Application Publication No. 2014/0125842;
U.S. Patent Application Publication No. 2014/0125853;
U.S. Patent Application Publication No. 2014/0125999;
U.S. Patent Application Publication No. 2014/0129378;
U.S. Patent Application Publication No. 2014/0131438;
U.S. Patent Application Publication No. 2014/0131441;
U.S. Patent Application Publication No. 2014/0131443;
U.S. Patent Application Publication No. 2014/0131444;
U.S. Patent Application Publication No. 2014/0131445;
U.S. Patent Application Publication No. 2014/0131448;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0151453;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0160329;
U.S. Patent Application Publication No. 2014/0166755;
U.S. Patent Application Publication No. 2014/0166757;
U.S. Patent Application Publication No. 2014/0166759;
U.S. Patent Application Publication No. 2014/0166760;
U.S. Patent Application Publication No. 2014/0166761;
U.S. Patent Application Publication No. 2014/0168787;
U.S. Patent Application Publication No. 2014/0175165;

U.S. Patent Application Publication No. 2014/0175169;
U.S. Patent Application Publication No. 2014/0175172;
U.S. Patent Application Publication No. 2014/0175174;
U.S. Patent Application Publication No. 2014/0191644;
U.S. Patent Application Publication No. 2014/0191913;
U.S. Patent Application Publication No. 2014/0197238;
U.S. Patent Application Publication No. 2014/0197239;
U.S. Patent Application Publication No. 2014/0197304;
U.S. Patent Application Publication No. 2014/0203087;
U.S. Patent Application Publication No. 2014/0204268;
U.S. Patent Application Publication No. 2014/0214631;
U.S. Patent Application Publication No. 2014/0217166;
U.S. Patent Application Publication No. 2014/0217180;
U.S. patent application Ser. No. 13/367,978 for a Laser Scanning Module Employing An Elastomeric U-Hinge Based Laser Scanning Assembly, filed Feb. 7, 2012 (Feng et al.);
U.S. patent application Ser. No. 29/436,337 for an Electronic Device, filed Nov. 5, 2012 (Fitch et al.);
U.S. patent application Ser. No. 13/771,508 for an Optical Redirection Adapter, filed Feb. 20, 2013 (Anderson);
U.S. patent application Ser. No. 13/852,097 for a System and Method for Capturing and Preserving Vehicle Event Data, filed Mar. 28, 2013 (Barker et al.);
U.S. patent application Ser. No. 13/902,110 for a System and Method for Display of Information Using a Vehicle-Mount Computer, filed May 24, 2013 (Hollifield);
U.S. patent application Ser. No. 13/902,144, for a System and Method for Display of Information Using a Vehicle-Mount Computer, filed May 24, 2013 (Chamberlin);
U.S. patent application Ser. No. 13/902,242 for a System For Providing A Continuous Communication Link With A Symbol Reading Device, filed May 24, 2013 (Smith et al.);
U.S. patent application Ser. No. 13/912,262 for a Method of Error Correction for 3D Imaging Device, filed Jun. 7, 2013 (Jovanovski et al.);
U.S. patent application Ser. No. 13/912,702 for a System and Method for Reading Code Symbols at Long Range Using Source Power Control, filed Jun. 7, 2013 (Xian et al.);
U.S. patent application Ser. No. 29/458,405 for an Electronic Device, filed Jun. 19, 2013 (Fitch et al.);
U.S. patent application Ser. No. 13/922,339 for a System and Method for Reading Code Symbols Using a Variable Field of View, filed Jun. 20, 2013 (Xian et al.);
U.S. patent application Ser. No. 13/927,398 for a Code Symbol Reading System Having Adaptive Autofocus, filed Jun. 26, 2013 (Todeschini);
U.S. patent application Ser. No. 13/930,913 for a Mobile Device Having an Improved User Interface for Reading Code Symbols, filed Jun. 28, 2013 (Gelay et al.);
U.S. patent application Ser. No. 29/459,620 for an Electronic Device Enclosure, filed Jul. 2, 2013 (London et al.);
U.S. patent application Ser. No. 29/459,681 for an Electronic Device Enclosure, filed Jul. 2, 2013 (Chaney et al.);
U.S. patent application Ser. No. 13/933,415 for an Electronic Device Case, filed Jul. 2, 2013 (London et al.);
U.S. patent application Ser. No. 29/459,785 for a Scanner and Charging Base, filed Jul. 3, 2013 (Fitch et al.);
U.S. patent application Ser. No. 29/459,823 for a Scanner, filed Jul. 3, 2013 (Zhou et al.);
U.S. patent application Ser. No. 13/947,296 for a System and Method for Selectively Reading Code Symbols, filed Jul. 22, 2013 (Rueblinger et al.);
U.S. patent application Ser. No. 13/950,544 for a Code Symbol Reading System Having Adjustable Object Detection, filed Jul. 25, 2013 (Jiang);
U.S. patent application Ser. No. 13/961,408 for a Method for Manufacturing Laser Scanners, filed Aug. 7, 2013 (Saber et al.);
U.S. patent application Ser. No. 14/018,729 for a Method for Operating a Laser Scanner, filed Sep. 5, 2013 (Feng et al.);
U.S. patent application Ser. No. 14/019,616 for a Device Having Light Source to Reduce Surface Pathogens, filed Sep. 6, 2013 (Todeschini);
U.S. patent application Ser. No. 14/023,762 for a Handheld Indicia Reader Having Locking Endcap, filed Sep. 11, 2013 (Gannon);
U.S. patent application Ser. No. 14/035,474 for Augmented-Reality Signature Capture, filed Sep. 24, 2013 (Todeschini);
U.S. patent application Ser. No. 29/468,118 for an Electronic Device Case, filed Sep. 26, 2013 (Oberpriller et al.);
U.S. patent application Ser. No. 14/055,234 for Dimensioning System, filed Oct. 16, 2013 (Fletcher);
U.S. patent application Ser. No. 14/053,314 for Indicia Reader, filed Oct. 14, 2013 (Huck);
U.S. patent application Ser. No. 14/065,768 for Hybrid System and Method for Reading Indicia, filed Oct. 29, 2013 (Meier et al.);
U.S. patent application Ser. No. 14/074,746 for Self-Checkout Shopping System, filed Nov. 8, 2013 (Hejl et al.);
U.S. patent application Ser. No. 14/074,787 for Method and System for Configuring Mobile Devices via NFC Technology, filed Nov. 8, 2013 (Smith et al.);
U.S. patent application Ser. No. 14/087,190 for Optimal Range Indicators for Bar Code Validation, filed Nov. 22, 2013 (Hejl);
U.S. patent application Ser. No. 14/094,087 for Method and System for Communicating Information in an Digital Signal, filed Dec. 2, 2013 (Peake et al.);
U.S. patent application Ser. No. 14/101,965 for High Dynamic-Range Indicia Reading System, filed Dec. 10, 2013 (Xian);
U.S. patent application Ser. No. 14/150,393 for Indicia-reader Having Unitary Construction Scanner, filed Jan. 8, 2014 (Colavito et al.);
U.S. patent application Ser. No. 14/154,207 for Laser Barcode Scanner, filed Jan. 14, 2014 (Hou et al.);
U.S. patent application Ser. No. 14/165,980 for System and Method for Measuring Irregular Objects with a Single Camera filed Jan. 28, 2014 (Li et al.);
U.S. patent application Ser. No. 14/166,103 for Indicia Reading Terminal Including Optical Filter filed Jan. 28, 2014 (Lu et al.);
U.S. patent application Ser. No. 14/200,405 for Indicia Reader for Size-Limited Applications filed Mar. 7, 2014 (Feng et al.);
U.S. patent application Ser. No. 14/231,898 for Hand-Mounted Indicia-Reading Device with Finger Motion Triggering filed Apr. 1, 2014 (Van Horn et al.);
U.S. patent application Ser. No. 14/250,923 for Reading Apparatus Having Partial Frame Operating Mode filed Apr. 11, 2014, (Deng et al.);
U.S. patent application Ser. No. 14/257,174 for Imaging Terminal Having Data Compression filed Apr. 21, 2014, (Barber et al.);
U.S. patent application Ser. No. 14/257,364 for Docking System and Method Using Near Field Communication filed Apr. 21, 2014 (Showering);
U.S. patent application Ser. No. 14/264,173 for Autofocus Lens System for Indicia Readers filed Apr. 29, 2014 (Ackley et al.);

U.S. patent application Ser. No. 14/274,858 for Mobile Printer with Optional Battery Accessory filed May 12, 2014 (Marty et al.);

U.S. patent application Ser. No. 14/277,337 for MULTI-PURPOSE OPTICAL READER, filed May 14, 2014 (Jovanovski et al.);

U.S. patent application Ser. No. 14/283,282 for TERMINAL HAVING ILLUMINATION AND FOCUS CONTROL filed May 21, 2014 (Liu et al.);

U.S. patent application Ser. No. 14/300,276 for METHOD AND SYSTEM FOR CONSIDERING INFORMATION ABOUT AN EXPECTED RESPONSE WHEN PERFORMING SPEECH RECOGNITION, filed Jun. 10, 2014 (Braho et al.);

U.S. patent application Ser. No. 14/305,153 for INDICIA READING SYSTEM EMPLOYING DIGITAL GAIN CONTROL filed Jun. 16, 2014 (Xian et al.);

U.S. patent application Ser. No. 14/310,226 for AUTOFOCUSING OPTICAL IMAGING DEVICE filed Jun. 20, 2014 (Koziol et al.);

U.S. patent application Ser. No. 14/327,722 for CUSTOMER FACING IMAGING SYSTEMS AND METHODS FOR OBTAINING IMAGES filed Jul. 10, 2014 (Oberpriller et al,);

U.S. patent application Ser. No. 14/327,827 for a MOBILE-PHONE ADAPTER FOR ELECTRONIC TRANSACTIONS, filed Jul. 10, 2014 (Hejl);

U.S. patent application Ser. No. 14/329,303 for CELL PHONE READING MODE USING IMAGE TIMER filed Jul. 11, 2014 (Coyle);

U.S. patent application Ser. No. 14/333,588 for SYMBOL READING SYSTEM WITH INTEGRATED SCALE BASE filed Jul. 17, 2014 (Barten);

U.S. patent application Ser. No. 14/334,934 for a SYSTEM AND METHOD FOR INDICIA VERIFICATION, filed Jul. 18, 2014 (Hejl);

U.S. patent application Ser. No. 14/336,188 for METHOD OF AND SYSTEM FOR DETECTING OBJECT WEIGHING INTERFERENCES, Filed Jul. 21, 2014 (Amundsen et al.);

U.S. patent application Ser. No. 14/339,708 for LASER SCANNING CODE SYMBOL READING SYSTEM, filed Jul. 24, 2014 (Xian et al.);

U.S. patent application Ser. No. 14/340,627 for an AXIALLY REINFORCED FLEXIBLE SCAN ELEMENT, filed Jul. 25, 2014 (Reublinger et al.);

U.S. patent application Ser. No. 14/340,716 for an OPTICAL IMAGER AND METHOD FOR CORRELATING A MEDICATION PACKAGE WITH A PATIENT, filed Jul. 25, 2014 (Ellis);

U.S. patent application Ser. No. 14/342,544 for Imaging Based Barcode Scanner Engine with Multiple Elements Supported on a Common Printed Circuit Board filed Mar. 4, 2014 (Liu et al.);

U.S. patent application Ser. No. 14/345,735 for Optical Indicia Reading Terminal with Combined Illumination filed Mar. 19, 2014 (Ouyang);

U.S. patent application Ser. No. 14/336,188 for METHOD OF AND SYSTEM FOR DETECTING OBJECT WEIGHING INTERFERENCES, Filed Jul. 21, 2014 (Amundsen et al.);

U.S. patent application Ser. No. 14/355,613 for Optical Indicia Reading Terminal with Color Image Sensor filed May 1, 2014 (Lu et al.);

U.S. patent application Ser. No. 14/370,237 for WEB-BASED SCAN-TASK ENABLED SYSTEM AND METHOD OF AND APPARATUS FOR DEVELOPING AND DEPLOYING THE SAME ON A CLIENT-SERVER NETWORK filed Jul. 2, 2014 (Chen et al.);

U.S. patent application Ser. No. 14/370,267 for INDUSTRIAL DESIGN FOR CONSUMER DEVICE BASED SCANNING AND MOBILITY, filed Jul. 2, 2014 (Ma et al.);

U.S. patent application Ser. No. 14/376,472, for an ENCODED INFORMATION READING TERMINAL INCLUDING HTTP SERVER, filed Aug. 4, 2014 (Lu);

U.S. patent application Ser. No. 14/379,057 for METHOD OF USING CAMERA SENSOR INTERFACE TO TRANSFER MULTIPLE CHANNELS OF SCAN DATA USING AN IMAGE FORMAT filed Aug. 15, 2014 (Wang et al.);

U.S. patent application Ser. No. 14/452,697 for INTERACTIVE INDICIA READER, filed Aug. 6, 2014 (Todeschini);

U.S. patent application Ser. No. 14/453,019 for DIMENSIONING SYSTEM WITH GUIDED ALIGNMENT, filed Aug. 6, 2014 (Li et al.);

U.S. patent application Ser. No. 14/460,387 for APPARATUS FOR DISPLAYING BAR CODES FROM LIGHT EMITTING DISPLAY SURFACES filed Aug. 15, 2014 (Van Horn et al.);

U.S. patent application Ser. No. 14/460,829 for ENCODED INFORMATION READING TERMINAL WITH WIRELESS PATH SELECTION CAPABILITY, filed Aug. 15, 2014 (Wang et al.);

U.S. patent application Ser. No. 14/462,801 for MOBILE COMPUTING DEVICE WITH DATA COGNITION SOFTWARE, filed on Aug. 19, 2014 (Todeschini et al.);

U.S. patent application Ser. No. 14/446,387 for INDICIA READING TERMINAL PROCESSING PLURALITY OF FRAMES OF IMAGE DATA RESPONSIVELY TO TRIGGER SIGNAL ACTIVATION filed Jul. 30, 2014 (Wang et al.);

U.S. patent application Ser. No. 14/446,391 for MULTIFUNCTION POINT OF SALE APPARATUS WITH OPTICAL SIGNATURE CAPTURE filed Jul. 30, 2014 (Good et al.);

U.S. patent application Ser. No. 29/486,759 for an Imaging Terminal, filed Apr. 2, 2014 (Oberpriller et al.);

U.S. patent application Ser. No. 29/492,903 for an INDICIA SCANNER, filed Jun. 4, 2014 (Zhou et al.); and U.S. patent application Ser. No. 29/494,725 for an IN-COUNTER BARCODE SCANNER, filed Jun. 24, 2014 (Oberpriller et al.).

* * *

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A method for recognizing speech in a speech recognition system, the method comprising the steps of:
  sensing, using a microphone, speech input and converting the sensed speech input to an electrical signal;
  converting, using a signal processor comprising an analog-to-digital converter, the electrical signal to digital data;

receiving, using a computing device, the digital data, the computing device having at least one processor and a memory;

processing the digital data, using the processor, to produce acoustic features and acoustic data;

processing the acoustic features and the acoustic data using the processor and a library of models corresponding to hypothesis words and stored on the memory, to derive a hypothesis, the hypothesis comprising a sequence of hypothesis words;

assigning each hypothesis word a confidence score;

retrieving from the memory an expected response comprising a sequence of at least one expected word and at least one wildcard word;

comparing the hypothesis word-by-word to the expected response;

adjusting an acceptance threshold for each hypothesis word based on the results of the comparison;

comparing the confidence score assigned to a hypothesis word to its adjusted acceptance threshold and accepting or rejecting the hypothesis word based on the results of the comparison; and if the hypothesis word is accepted, updating acoustic features and acoustic data of a model, in the library of models, corresponding to the hypothesis word using the acoustic features and acoustic data corresponding to the hypothesis word.

2. The method of claim 1, wherein one confidence score is assigned to more than one hypothesis words.

3. The method according to claim 1, comprising adjusting the acceptance threshold for a hypothesis word by an exact-match adjustment amount if the hypothesis word matches a corresponding expected word in the expected response.

4. The method according to claim 1, comprising adjusting the acceptance threshold for a hypothesis word by a wildcard-match adjustment amount if the hypothesis word corresponds to a wildcard word in the expected response.

5. The method according to claim 1, wherein the acceptance thresholds for hypothesis words corresponding to wildcard words in the expected response are adjusted differently from acceptance thresholds for hypothesis words corresponding to expected words in the expected response.

6. The method according to claim 1, comprising not adjusting the acceptance threshold for any hypothesis words in the hypothesis if a hypothesis word in the hypothesis does not match its corresponding expected word in the expected response.

7. The method according to claim 1, comprising comparing the confidence score assigned to each hypothesis word in the hypothesis to its acceptance threshold and accepting or rejecting the hypothesis word based on the results of the comparison.

8. The method according to claim 7, comprising accepting the hypothesis word if its confidence score exceeds its acceptance threshold or rejecting the hypothesis word otherwise.

9. A method for recognizing speech in a speech recognition system, the method comprising the steps of:

sensing, using a microphone, speech input and converting the sensed speech input to an electrical signal;

converting, using a signal processor comprising an analog-to-digital converter, the electrical signal to digital data;

receiving, using a computing device, the digital data, the computing device having at least one processor and a memory;

processing the digital data, using the processor, to produce acoustic features and acoustic data;

deriving a hypothesis, using the processor running speech recognition algorithms, the acoustic features, the acoustic data, and a library of models corresponding to hypothesis words stored in the memory, the hypothesis comprising a sequence of hypothesis words;

retrieving from the memory an expected response comprising a sequence of at least one expected word and at least one wildcard word;

comparing, in sequence, each hypothesis word in the hypothesis to its corresponding expected word or wildcard word in the expected response;

if the hypothesis word matches the corresponding expected word, then marking the hypothesis word as suitable for use in adaptation;

adapting acoustic features and acoustic data of the models corresponding to hypothesis words marked suitable for adaptation using the acoustic features and the acoustic data corresponding to those hypothesis words;

deriving a hypothesis word, using the processor running speech recognition algorithms and an adapted model of the adapted models stored in the memory; and comparing a confidence score assigned to the hypothesis word derived from the adapted model to an acceptance threshold and accepting or rejecting the hypothesis word based on the results of the comparison.

10. The method according to claim 9, comprising marking a hypothesis word as not suitable for adaptation if the hypothesis word corresponds to a wildcard word in the expected response, and not using the acoustic data corresponding to the hypothesis words marked as not suitable for adaptation to adapt the models corresponding to those hypothesis words.

11. The method according to claim 9, comprising marking all words in the hypothesis as not suitable for adaptation if a hypothesis word in the hypothesis does not match its corresponding expected word in the expected response, and not adapting the models corresponding to hypothesis words marked not suitable for adaptation.

12. A system for recognizing speech, comprising:

a microphone configured to sense speech input and convert the sensed speech input to an electrical signal;

a signal processor configured to convert the electrical signal to digital data, the signal processor comprising an analog-to-digital converter;

a computing device comprising a processor and a memory configured to execute (i) a recognition algorithm, (ii) a threshold-adjustment algorithm, and (iii) an acceptance algorithm, wherein:

the recognition algorithm processes the digital data to produce acoustic features and acoustic data and assesses the acoustic features and the acoustic data using a library of models corresponding to hypothesis words stored in the memory to generate (i) a hypothesis comprising hypothesis words and (ii) a confidence score associated with one or more hypothesis words;

the threshold-adjustment algorithm adjusts an acceptance threshold corresponding to a hypothesis word if the hypothesis matches an expected response stored in the memory, wherein the expected response comprises at least one expected word and at least one wildcard word; and the acceptance algorithm accepts a hypothesis word and updates acoustic features and acoustic data of a model, in the library of models, corresponding to the hypothesis word when the hypothesis word's confidence score exceeds the hypothesis word's acceptance threshold.

13. The system according to claim 12, wherein the threshold-adjustment algorithm comprises (i) reducing the acceptance threshold for hypothesis words that match corresponding expected words by an exact-match adjustment amount and (ii) reducing the acceptance threshold for hypothesis words that match corresponding wildcard words by a wildcard-match adjustment amount.

14. The system according to claim 13, wherein the exact-match adjustment amount is greater than the wildcard-match adjustment amount.

15. The system according to claim 12, wherein no hypothesis-word acceptance thresholds are adjusted if at least one hypothesis word does not match its corresponding expected word in the expected response.

16. The system according to claim 15, wherein the threshold-adjustment algorithm comprises reducing the acceptance threshold for hypothesis words that match corresponding wildcard words by an amount that depends on the matching condition between other hypothesis words and expected words.

17. A system for recognizing speech, comprising:
a microphone configured to sense speech input and convert the sensed speech input to an electrical signal;
a signal processor configured to convert the electrical signal to digital data, the signal processor comprising an analog-to-digital converter;
a computing device comprising a processor and a memory configured to execute (i) a recognition algorithm, (ii) a model-update algorithm, and (iii) an acceptance algorithm, wherein:
the recognition algorithm processes the digital data to produce acoustic features and acoustic data and assesses the acoustic features and the acoustic data using a library of models corresponding to hypothesis words stored in the memory to generate a hypothesis comprising hypothesis words;
the model-update algorithm (i) compares the sequence of words of the hypothesis to an expected response stored in the memory, the expected response comprising expected words and at least one wildcard word, (ii) marks each hypothesis word that matches a corresponding expected word in the expected response as suitable for adaptation, and (iii) adapts acoustic features and acoustic data of a model for a hypothesis word marked suitable for adaptation using the acoustic features and the acoustic data corresponding to that hypothesis word; and
the acceptance algorithm accepts a hypothesis word when the hypothesis word's confidence score exceeds the hypothesis word's acceptance threshold.

18. The system according to claim 17, wherein the model-update algorithm does not use the acoustic data corresponding to hypothesis words marked not suitable for adaptation to adapt the models, and the hypothesis words marked not suitable for adaptation comprise hypothesis words that correspond to wildcard words in the expected response.

19. The system according to claim 17, wherein the model-update algorithm does not use the acoustic data corresponding to hypothesis words marked not suitable for adaptation to adapt the models, and the hypothesis words marked not suitable for adaptation comprise hypothesis words that do not match corresponding expected words in the expected response.

20. The system according to claim 17, wherein the model-update algorithm does not use the acoustic data corresponding to hypothesis words marked not suitable for adaptation to adapt the library of models, and all hypothesis words are marked as not suitable for adaptation if at least one hypothesis word does not match its corresponding expected word in the expected response.

\* \* \* \* \*